US012644484B2

(12) United States Patent　　　(10) Patent No.:　US 12,644,484 B2
Dickinson et al.　　　　　　　　(45) Date of Patent:　　Jun. 2, 2026

(54) STRUCTURAL FASTENER

(71) Applicant: Mag Daddy LLC, Wauconda, IL (US)

(72) Inventors: Daniel James Dickinson, Lincolnshire,
IL (US); Michael Walter Smith,
Palatine, IL (US); Scott Schnur, Lake
Zurich, IL (US)

(73) Assignee: MAG DADDY LLC, Wauconda, IL
(US)

( * ) Notice: Subject to any disclaimer, the term of this
patent is extended or adjusted under 35
U.S.C. 154(b) by 0 days.

(21) Appl. No.: 17/405,030

(22) Filed: Aug. 18, 2021

(65) Prior Publication Data

US 2021/0404504 A1　　　Dec. 30, 2021

Related U.S. Application Data

(63) Continuation-in-part of application No. 16/779,870,
filed on Feb. 3, 2020, now Pat. No. 11,655,841, which
is a continuation-in-part of application No.
16/597,060, filed on Oct. 9, 2019, now Pat. No.
11,784,428, which is a continuation-in-part of
application No. 15/998,605, filed on Aug. 20, 2018,
now Pat. No. 11,261,897, said application No.
16/779,870 is a continuation-in-part of application
No. 16/040,413, filed on Jul. 19, 2018, now Pat. No.
10,865,825.

(60) Provisional application No. 63/067,762, filed on Aug.
19, 2020.

(51) Int. Cl.
*F16B 37/04*　　　(2006.01)

(52) U.S. Cl.
CPC ................................. *F16B 37/045* (2013.01)

(58) Field of Classification Search
CPC .... F16B 37/045; F16B 37/046; F16B 39/282;
F16L 3/2431
See application file for complete search history.

(56) References Cited

U.S. PATENT DOCUMENTS

| | | | | |
|---|---|---|---|---|
| 4,377,360 | A | * | 3/1983 | Kennedy ............... F16B 37/046 |
| | | | | 411/116 |
| 4,545,697 | A | * | 10/1985 | Verdenne .............. F16B 37/044 |
| | | | | 403/252 |
| 4,645,393 | A | * | 2/1987 | Pletcher ................ F16B 37/046 |
| | | | | 411/113 |
| 4,840,525 | A | * | 6/1989 | Rebentisch ........... F16B 37/045 |
| | | | | 403/348 |
| 5,209,619 | A | * | 5/1993 | Rinderer ............... F16B 37/045 |
| | | | | 411/85 |
| 5,489,173 | A | * | 2/1996 | Hofle .................... F16B 37/046 |
| | | | | 411/85 |

(Continued)

*Primary Examiner* — Bradley Duckworth

(57)　　　　　　　ABSTRACT

A nut operable for blind attachment between two rims on
opposite sides of a strut channel. According to one embodi-
ment, the nut is a spin nut operable to insert the nut into the
channel, rotate and lock the nut onto the two rims on the
strut. The spin nut includes a base, a pair of wings formed
on one end of the base and operable to attach to two rims.
The symmetrical helix is formed on the wings on the other
end of the base. A shoulder extends from the symmetrical
helix. A hole, such as a threaded hole is formed in the
shoulder extending into the base, forming a threaded nut,
according to one embodiment. A bolt may be inserted into
the threaded hole to attach to a bracket, strut, plate or any
suitable structure.

27 Claims, 9 Drawing Sheets

(56) References Cited

U.S. PATENT DOCUMENTS

| | | | | |
|---|---|---|---|---|
| 5,655,865 | A * | 8/1997 | Plank | E04D 3/08 |
| | | | | 403/258 |
| 6,726,117 | B2 * | 4/2004 | Herb | F16B 37/046 |
| | | | | 238/315 |
| 7,604,444 | B2 * | 10/2009 | Wu | F16B 37/046 |
| | | | | 411/85 |
| 8,657,545 | B2 * | 2/2014 | Magno, Jr. | F16B 7/187 |
| | | | | 248/316.1 |
| 9,103,365 | B2 * | 8/2015 | Whipple | F16B 37/045 |
| 9,151,309 | B2 * | 10/2015 | Magno, Jr. | F16B 2/18 |
| 9,790,980 | B2 * | 10/2017 | McCarthy | F16B 37/045 |
| 10,161,127 | B2 * | 12/2018 | Zhang | E04B 1/40 |
| 10,302,249 | B1 * | 5/2019 | Kelly | B25H 1/04 |
| 10,619,791 | B2 * | 4/2020 | Zhang | F16B 37/045 |
| 11,047,409 | B2 * | 6/2021 | Oh | F16B 35/06 |
| 11,572,913 | B2 * | 2/2023 | Hepworth | F16B 13/10 |
| 2015/0316203 | A1 * | 11/2015 | Zhang | F16B 7/187 |
| | | | | 248/65 |
| 2018/0266476 | A1 * | 9/2018 | Linka | F16B 37/046 |
| 2022/0128085 | A1 * | 4/2022 | Schaefer | F16B 37/045 |

* cited by examiner

400

300

STRUCTURAL FASTENER

This application claims benefit of provisional U.S. Patent Application 63/067,762 entitled "Structural Fastener" filed on Aug. 19, 2020. This application is a continuation in part application of U.S. patent application Ser. No. 16/779,870 entitled "Structural Fastener" filed on Feb. 3, 2020, which is a continuation in part application of U.S. patent application Ser. No. 16/597,060 entitled "Structural Fastener" filed on Oct. 9, 2019, which is a continuation in part application of U.S. patent application Ser. No. 15/998,605 entitled "Structural Fastener" filed on Aug. 20, 2018. This application is a continuation in part application of U.S. patent application Ser. No. 16/779,870 entitled "Structural Fastener" filed on Feb. 3, 2020, which is a continuation in part application of U.S. patent application Ser. No. 16/040,413 entitled "Structural Fastener" filed on Jul. 19, 2018.

FIELD OF THE INVENTION

The invention relates generally to devices for fastening objects, and more particularly to pipe brackets, fasteners and strut hangers to secure construction components such as pipes, conduit, cables and so forth or to attach onto an engagement structure, such as a chassis, a strut, a hollow substrate, a wall, a plate or any suitable surface.

BACKGROUND OF THE INVENTION

A number of devices and fasteners in building construction are currently available to secure cables and/or for fastening threaded rods to struts, brackets, ceilings, frames, walls, roofs, fixtures, panels, body panels, building structure, and electrical conduit to the chassis or frame of a building. For example, spring nuts and other devices are used to secure bolts and threaded rods to a strut or truss. Clamps and cable ties are used to secure cables in electrical wiring and boxes. As used herein, a strut refers to a u-shaped bracket having holes to allow for attachment at various points and to facilitate a variety of construction situations. In their basic and convention forms, struts are used extensively in buildings however the convention struts are time consuming to install and as a result are prone to incorrect and unstable assembly. The chassis of the building may include any substrate, plate, roof or ceiling support, structural framework, chassis component or subcomponent, support component, wall or any suitable object or combination.

Pipes may be hung and supported by the bottom of a u-shaped clevis shaped bracket. The top of the bracket has a slot to allow a threaded rod and nut above and another nut below to support the bracket. The threaded rod may then be attached to a chassis or building strut. However, both nuts must be turned and threaded from one end of the long rod. Once the pipe is installed, adjustment of the nut position requires supporting the weight of the pipe and rotation of both nuts. Such an attachment is time consuming and requires using both hands is tedious and prone to improper assembly.

Attaching conduit, electrical boxes, wires or cables to a building structure, electrical box or body panel typically requires securing threaded rods with two bolts to support wires, cable clamps, electrical boxes, screw-in cable clamps, straps, tape or clips already fastened to a wire assembly. At least some of the fasteners require extended height or blind insertion and installation of the fasteners in difficult locations because the installer is not able to fully view the fastener or the mounting point on the body panel. These known fasteners require fastening with a wrench, ratchet wrench or screw driver and thus are cumbersome and difficult to install, especially in inaccessible areas. Nor can they be installed without a wrench, ratchet or screw driver for example on an electrical box, conduit or in automobile environments that can be difficult. Further, replacement of an installed, broken nut, rod or strut requires removal and can again be difficult and time consuming.

Conventional nuts such as hex nuts and spring nuts are placed by hand into a channel of strut to attach other structural components (e.g., another strut, cable hanger, bracket, etc.) to the strut such as a conventional nut described in U.S. Pat. No. 9,103,365 incorporated by reference. Further, two conventional nuts on either side of the strut are required to be separately spun and rotated and threaded onto the rod to clamp the rod in place into the strut. However conventional nuts require the installer to hold the nuts in place with one hand while rotating the threaded rod, then threading the second nut with their other hand, requiring two hands. A spring nut thus requires two hands since an installer inserts the nut and the spring between the channel back and the channel opening while rotating the threaded rod with their other hand.

DETAILED DESCRIPTION OF THE PREFERRED EMBODIMENTS

A nut operable for blind attachment between two rims on opposite sides of a strut channel. According to one embodiment, the nut is a spin nut operable to insert the nut into the channel, rotate and lock the nut onto the two rims on the strut. The spin nut includes a base, a pair of wings formed on one end of the base and operable to attach to two rims. The symmetrical helix is formed on the wings on the other end of the base. A shoulder extends from the symmetrical helix. A hole, such as a threaded hole is formed in the shoulder extending into the base, forming a threaded nut, according to one embodiment. A bolt may be inserted into the threaded hole to attach to a bracket, strut, plate or any suitable structure.

Figure 7:
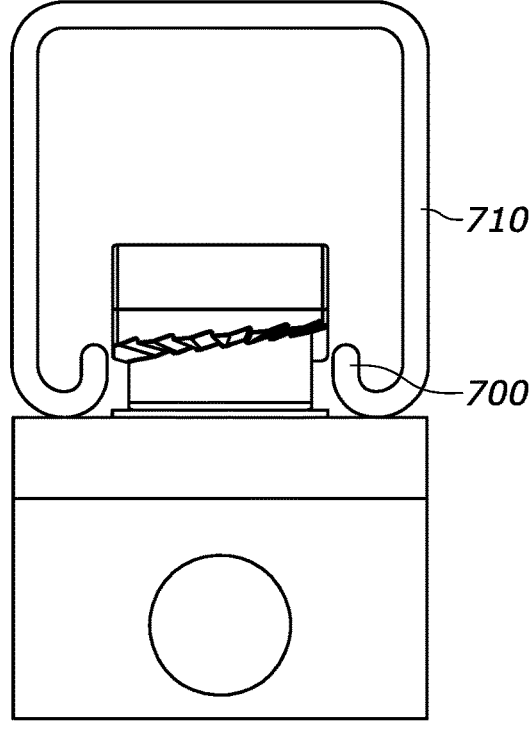
FIG. 7 is a side view of the spin nut inserted into a strut channel before engagement.

According to another embodiment, the symmetrical helix further comprises a plurality of steps. The symmetrical helix further includes a plurality of steps having a curvature corresponding to the surface contact on the two rims. The symmetrical helix engages the two rims. According to one embodiment, the symmetrical helix has an increasingly greater angle. Further, the symmetrical helix may include at least two steps however 3, 4, 5, 6, 7, 8, 10, 12 or any suitable number steps are contemplated. As shown in FIG. 7, the strut typically is a U shaped structure with curved rims at the ends of U shaped structure. The two rims are formed on the channel of a strut. According to one embodiment, the pair of wings has an insert to accept a threaded nut.

According to one embodiment the wings on the nut have an insert to accept a nut such that the nut allows the bolt to thread into the nut and attach the nut to the bracket. Among other advantages, rather than threading the pair of wings a hole 400 may be formed in the pair or wings to allow a threaded fastener 320 such as a bolt to be inserted. This has the advantage of avoiding relatively expensive tooling to form threads in the pair of wings.

The nut, bracket, bolt, nut insert and strut are comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass, carbon fiber or similar materials. According to one embodiment, the bolt 320 attaches to a bracket and to the threaded hole via a compression washer 900. The compression washer 900 may be any suitable shape, size or function such as wavy, split, notched, stepped, or collapsible. For example, the compression washer 900 may be bent or wavy to provide a spring function in order to have a linear load deflection range and can absorb impulses, linear or non-linear forces.

During installation, the symmetrical helix rotates to a height to adjust to a corresponding engagement height of the two rims. Thus the nut may be easily inserted into the channel of the strut and rotated such that the wings continuously adapt to variations in height of the rim in order to adjust the position of the strut. Thus, only a single spin nut need be used with a building, chassis or application even if different strut attachment lengths are required at different attachment points.

Figure 6:
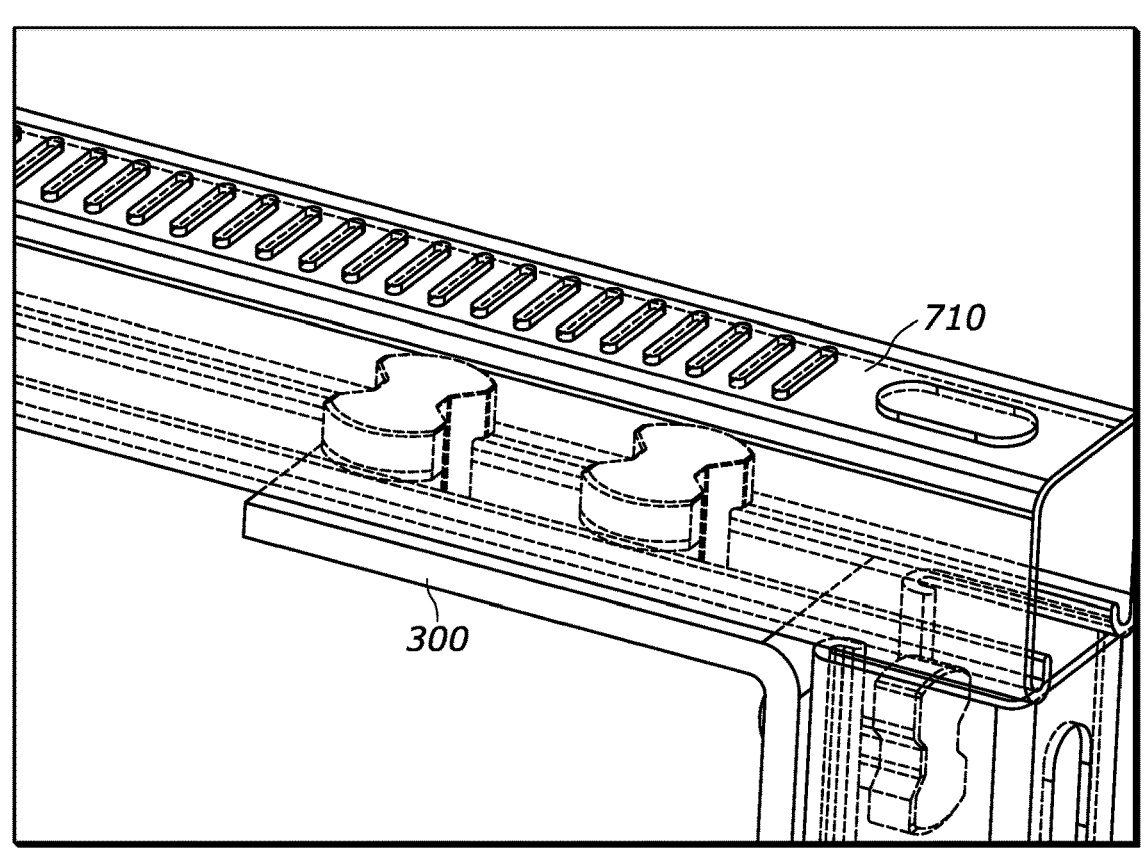
FIG. 6 is an assembly view of the spin nut attached to a bracket supporting and forming a corner with two struts according to one embodiment.

As shown in FIG. 6, the nut permits relatively easy attachment of the bracket such as a corner bracket in order to allow two struts to form a corner. The corner strut may be threaded onto a threaded rod and into a building chassis, pillar, structure, door, roof or suitable panel while providing a relatively high level of strength and support. Assembly of the nut onto the bracket and the struts is very easy and may be performed with one hand and requires no or a relatively low level of installation effort and as a result provides many ergonomic advantages. The nut eliminates the need for threading a conventional nut on a long threaded rod, and thus significantly reduces the time to attach the nut to the threaded rod assembly. Also, the installer can attach the nut with one hand whereas the prior art conventional nuts require two hands to hold the nuts, thread the nuts onto the rod, insert, position and tighten onto the structural construction member. Also, conventional nuts do not self align the nut with the channel, so readjustment of the conventional first and second nuts is required to align the rod to the strut. In contrast, the nut automatically self aligns because the wings self adjust onto the rims for engagement on the strut rim at a suitable height. Thus no manual positioning or alignment of the nut or corner bracket is required.

The relatively easy attachment is particularly advantageous for operators who repetitively install multi sectioned nuts, brackets, corner brackets and struts onto the building or chassis. The relatively easy installation required for inserting the nut into the strut and the building results in fewer injuries to the assembly workers, including injuries related to repetitive stress syndrome from rotating nuts onto long threaded rods. Further by selecting a single nut or reducing the number of different fasteners for fastening different strut lengths and thicknesses, eliminates confusion during assembly since the same type or a reduced number of fasteners may be used for all or most struts. Thus, an electrician, installer, or assembly worker need not worry about selecting the wrong fastener.

The relatively high level of strength, characteristic of the rotating locking nut "nut", securely attaches the strut and may also attach to the building or chassis. Further, the nut quickly and easily adjusts to the strut and eliminates or minimizes long tedious threading of nuts on the threaded rods, eliminating stripping threads, rounding hex nut edges, flexing of the threaded fastener and structural members, pushing and bending by operators, vibration and thermal expansion. For example, since conventional top and bottom nuts between the strut are required to clamp the strut, changes in length of the strut or rod requires untightening and re-tightening of the nuts. In contrast, the nut is easily rotated in the strut slot and the nut may be easily rotated for engagement onto the strut rim and optionally moved along the strut rims for the desired position on the strut. The nut may also fasten to plastic and/or metal engagement structures. The nut may be made of anti-corrosive material such as plastic or treated metal to provide long reliable service life.

Yet another advantage is that the nut is relatively easy to manufacture using relatively inexpensive manufacturing processes and materials such as casting, cut or forged steel alloy or any suitable material. The use of the nut decreases installation effort and time, reduces assembly and construction costs, increases worker productivity and efficiency, improves reliability and quality and decreases overall assembly, warranty and maintenance costs. The nut improves reliability both in the short term and in the long term, while further improving safety and quality.

Figure 1A:
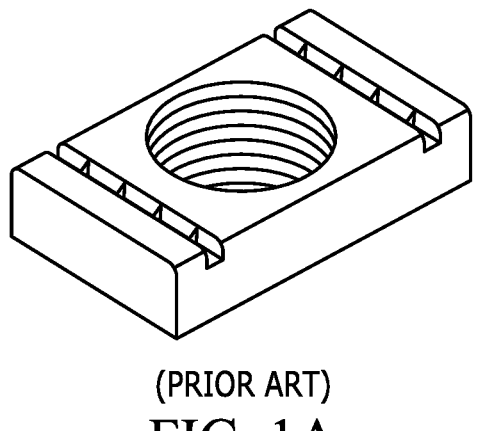
FIG. 1A is a prior art channel nut without a spring.
Figure 1B:
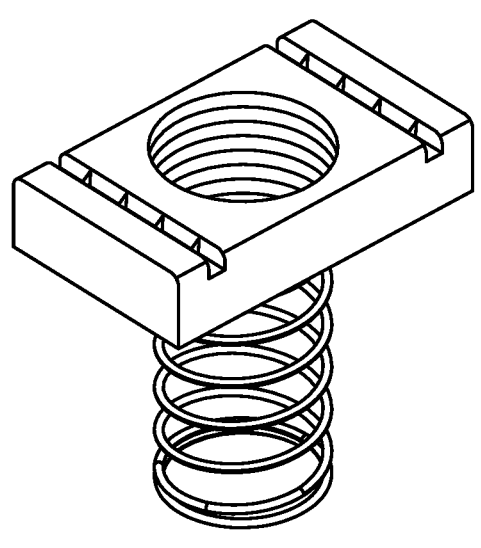
FIG. 1B is a prior art channel nut with a spring.

FIGS. 1A and 1B are prior art channel nuts without a spring and a channel nut with a spring. FIG. 1A is a prior art channel nut without a spring. An installer would need to use one hand to hold the channel nut and the other hand to hold the strut while simultaneously inserting and rotating the channel nut while also inserting a bolt into the channel nut. Thu installer will have to reattempt installation if the channel nut falls into the channel. FIG. 1B is a prior art channel nut with a spring. The spring theoretically temporarily pushes the channel nut against the rim so that the installer can insert the bolt and tighten the channel nut to the strut. However the springs often collapse, snap out of the strut channel and require continuous adjustment manually until the position of the channel nut aligns with bracket holes.

These prior art channel nuts require both hands and several manipulations by the installer.

Figure 2:
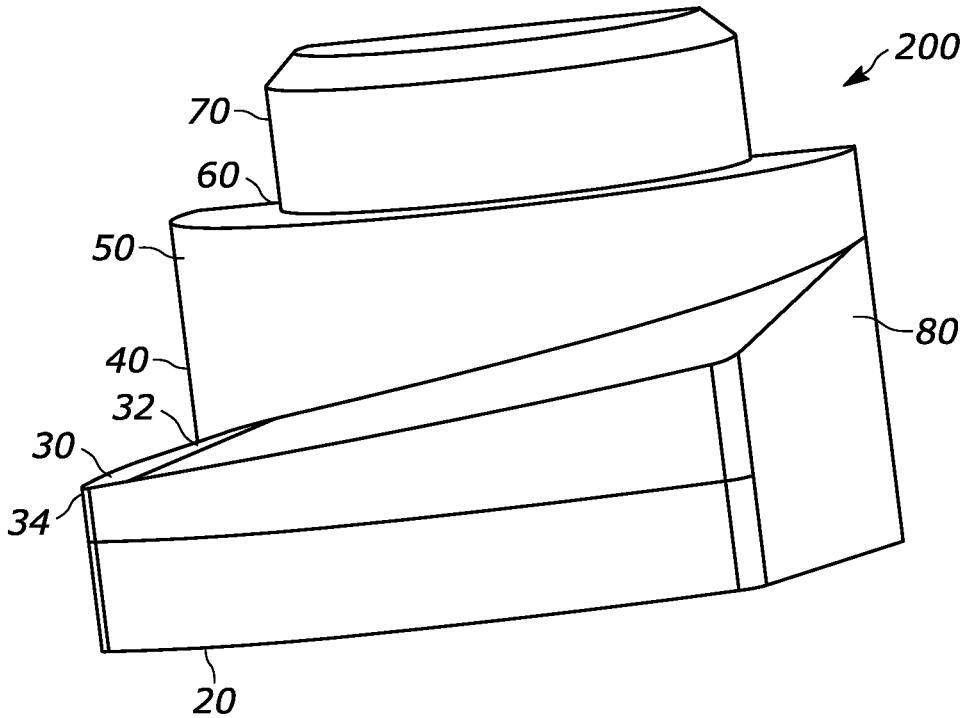
FIG. 2 is a perspective view of a nut operable to attach to two rims on a strut according to one embodiment.

FIG. 2 is a side view of a nut 200 operable to attach to two rims 700 on a strut 710 according to one embodiment. The nut 200 includes a base or bottom 20 (see FIG. 2) having a helix 30 (such as a helical slope) having a locking surface 40, shoulder 50, a washer 60 and a collar 70 for attaching to and supporting a bracket 300 (see FIG. 3) and a bracket 710.

Figure 2A:
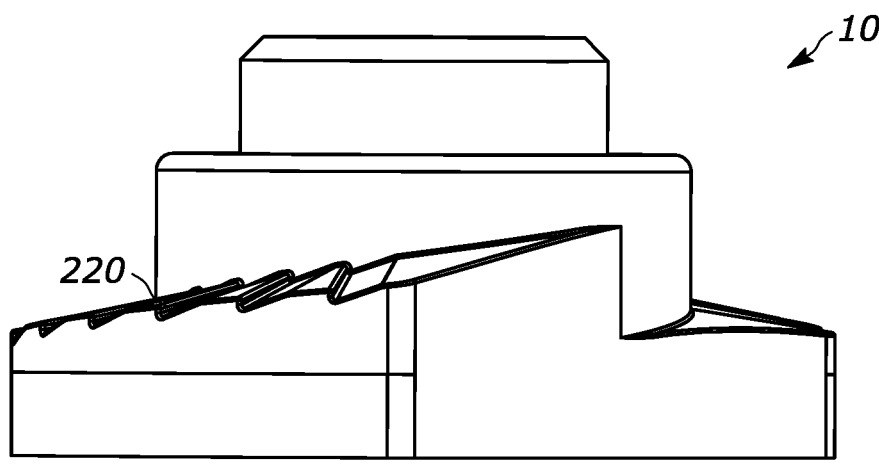
FIG. 2A is a side view of a nut operable to attach to two rims on a strut according to another embodiment.

FIG. 2A is a side view of a nut 10 is similar to nut 200 further including steps 220. Although FIG. 2A shows general features and thus contemplates many features such as steps 220 or notches, according to one embodiment, the nut is shown with the features in the drawings although any suitable features are contemplated.

Figure 4:
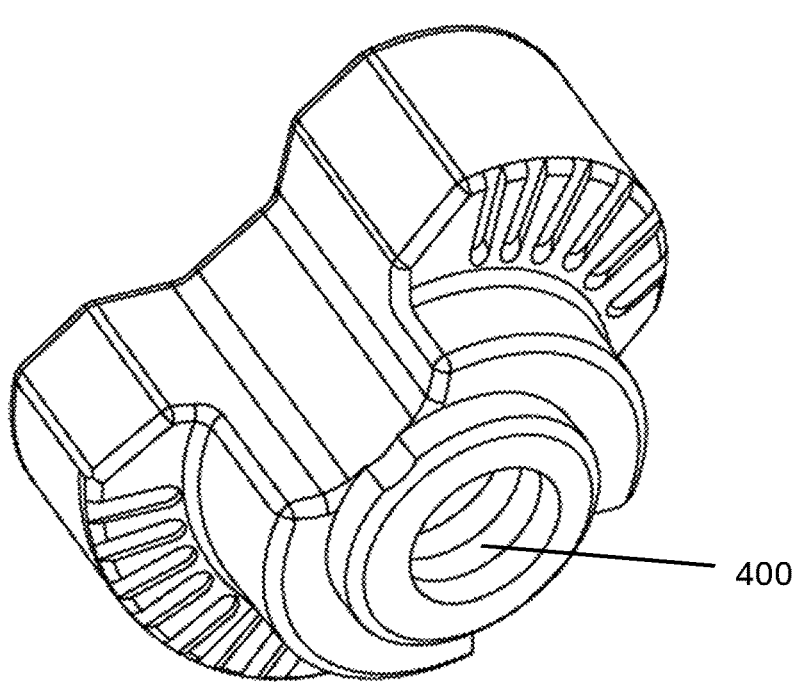
FIG. 4 is a perspective view of a helical spin nut according to one embodiment.

As shown in FIG. 4 shoulder 50 extends from the symmetrical helix. A hole 400 is formed in the shoulder extending into the base. According to one embodiment the hole 400 is threaded, such as a threaded nut. A fastener such as a bolt 320 may be inserted into the (threaded) hole 400 to attach to a bracket 300.

Figure 5:
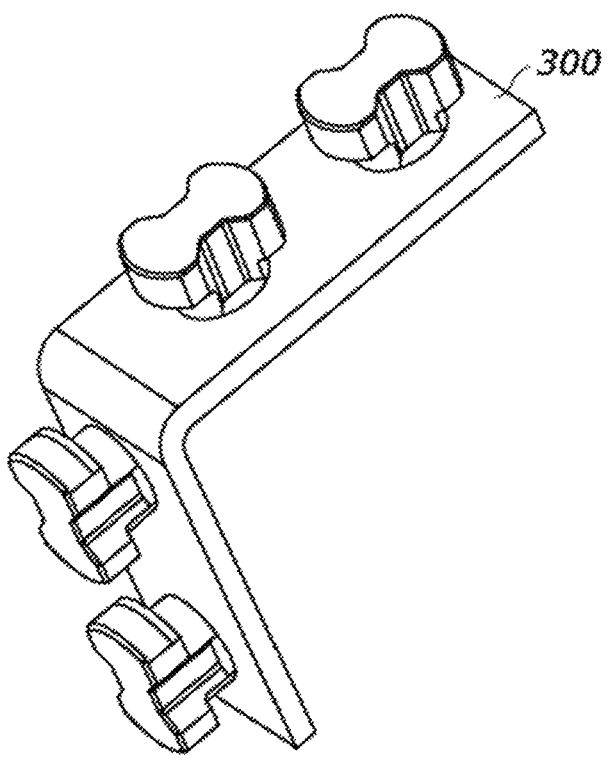
FIG. 5 is a view of the bracket according to one embodiment.

The nut 10, 200 and bracket 300 assembly (FIG. 5) may then couple the threaded nut 10, 200 via threaded rod functioning as a fastener 320 such that the threaded nut 10, 200 is operable to spin onto any position on a threaded rod embodiment of fastener 320 as described in the parent applications as cited at the beginning of this specification. At least one wing 80 is formed on the nut 10, 200 and is formed on one end of the base 20 operable to attach to two rims 700 of strut 710. The nut 10, 200 is operable to attach to a bracket 300 having a hole 310 and is operable to spin about the fastener 320 to adjust to a position on the rims 700.

Figure 9:
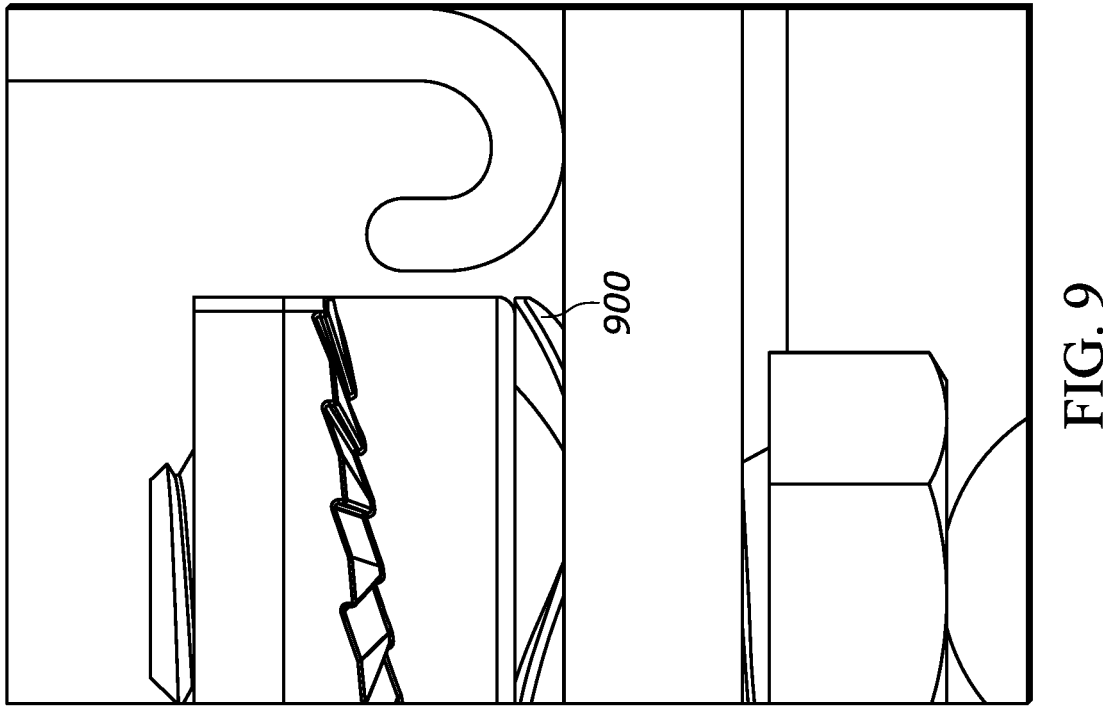
FIG. 9 is an enlarged view of the spin nut shown in FIG. 7 inserted into a strut channel before rotation and engagement with the rim of the strut.
Figure 8:
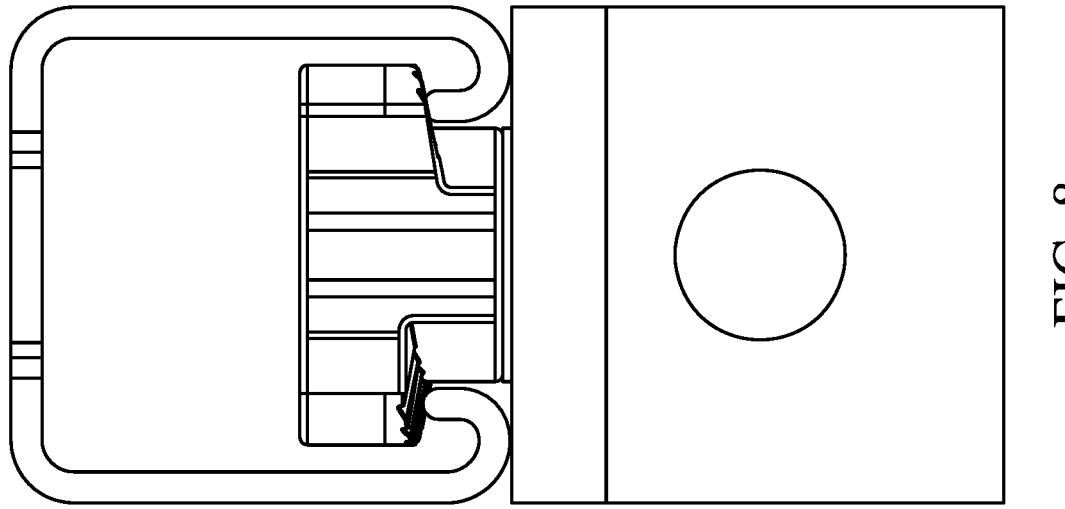
FIG. 8 is a side view of the spin nut inserted into a strut channel and rotated to engage the rims on the strut according to one embodiment.

FIG. 9 is a view of the spin nut 200 opening just before inserted into a rim 700. The snap retainer or washer 60 is detachably coupled the collar 70 and is operable to spring between bracket 300 and the shoulder 50. The washer 60 helps to hold nut 10, 200 and avoid nut 10, 200 from spinning while fastener 320 is turned and threaded into nut 10, 200.

Figure 3:
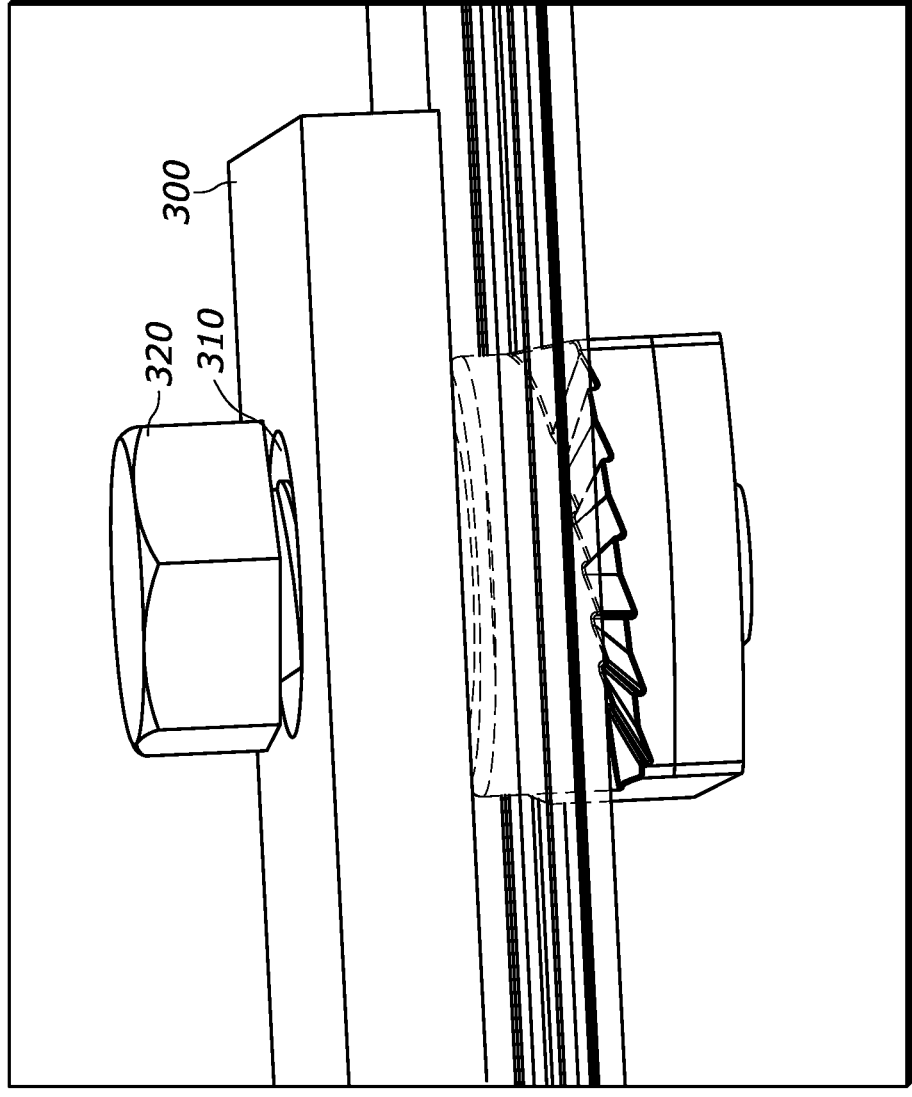
FIG. 3 is a view of a nut operable for blind attachment attached to a bracket and a strut.
Figure 12:
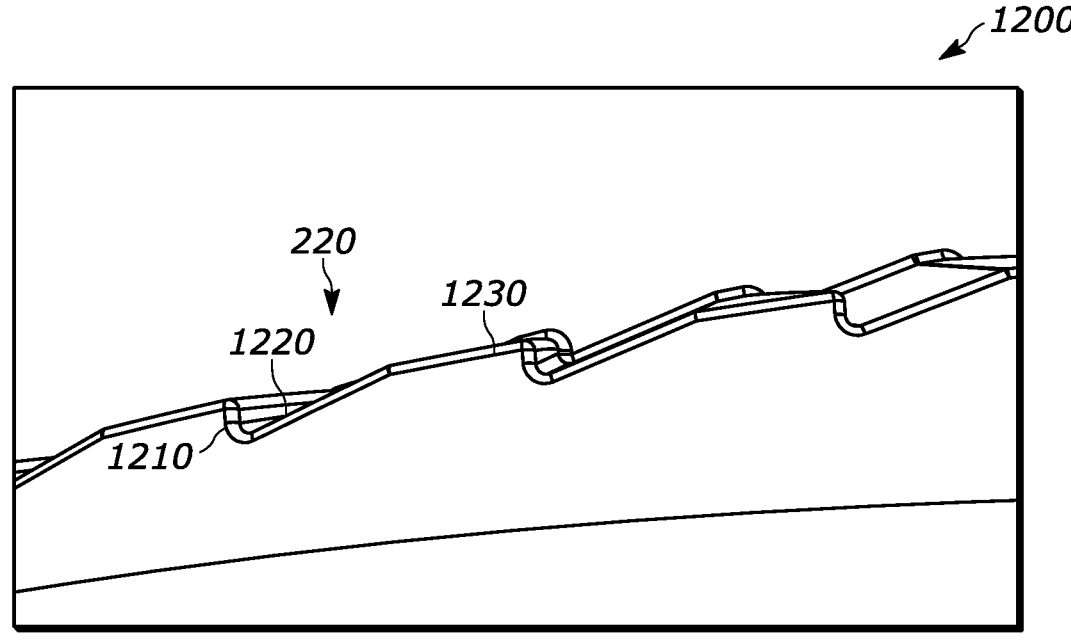
FIG. 12 is an enlarged view of a symmetrical helix and a plurality of steps according to one embodiment.
Figure 14:
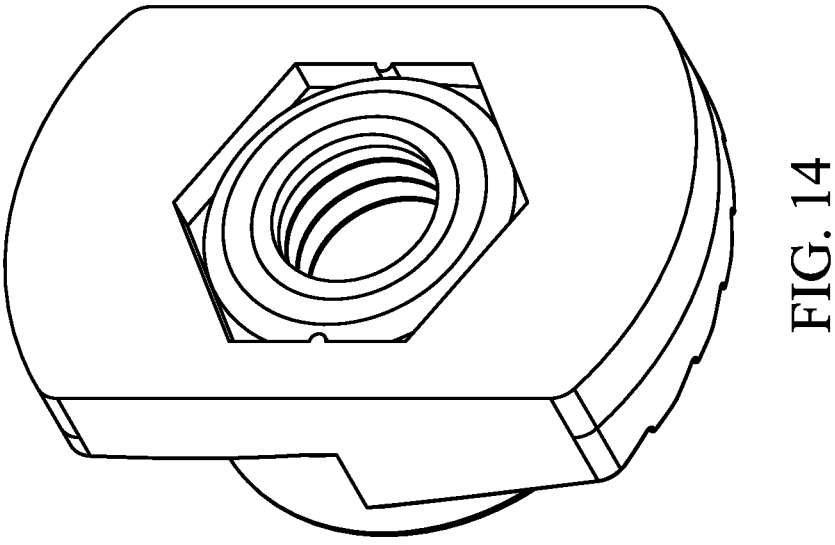
FIG. 14 is a bottom perspective view of the nut and a threaded fastener insert according to one embodiment.
Figure 13:
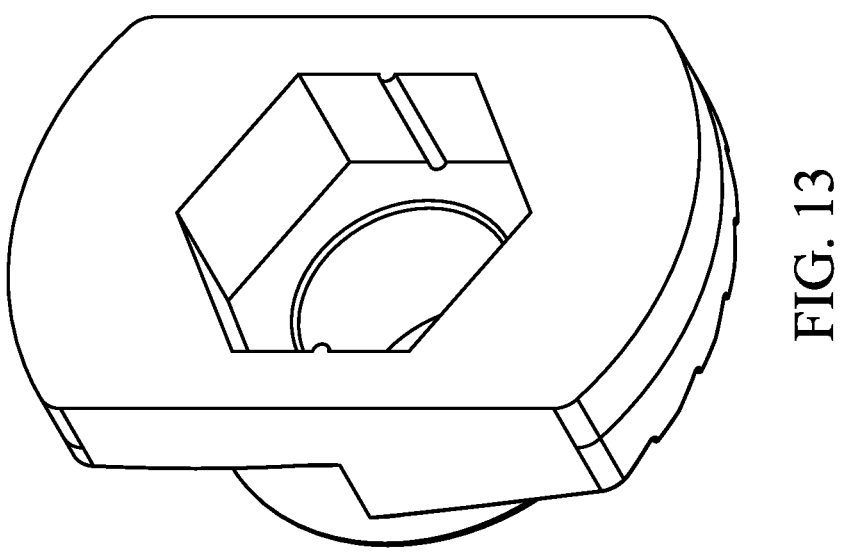
FIG. 13 is a bottom perspective view of the nut having a hole for a threaded fastener according to one embodiment.

As shown in FIGS. 2 and 3, the spin nuts 10, 200 includes the helical slope 30 having an inner helix 32 closest to the axial center and an outer helix 34 on the peripheral. The inner helix 32 may be sloped axially relative to the nut 10, 200, either angled positive or negative according to a suitable angle for the desired engagement height and degree of locking. At least one helix 30 and inner helix 32 is formed on the spin nuts 10, 20 and may include 2, 3, 4 or more helix 30 or any suitable number of helix 30. According to one embodiment the spin nuts 10, 20 have two symmetrical helix 30. In this embodiment helix 30 glides or engages rims 700 in a continuous manner and engages to a large number or infinite increments of distances between the strut 710 and the bracket 300. As shown in FIG. 3, alternatively helix 30 includes a plurality of steps 220. The steps 220 can further lock or engage the helix 30 on nut 200 to strut 710, the According to one embodiment the steps 220, 1200 as also shown in FIG. 12 includes a drop 1210, a pitch 1220, and a peak 1230. Although about 6 steps are shown, any suitable number of steps 220 is contemplated such as 3, 4, 5, 6, 7, 8, 10, 12, 20 or more. The shape of the drop 1210, the pitch 120 and the peak 1230 can be round, angled, curved, pointed, sharp or steep angle to provide an appropriate level of engaging distance between the fastener 320 and the strut 710, and the degree of engagement or locking.

During installation, the nut 10, 200 may be easily inserted and clamped to a pair of rims 700. The nut 10, 200 continuously adapt to variations in height in order to adjust to the position of the rims 700 on the strut 710. Thus, only a single nut 10 need be used with a building, chassis or application even if different strut attachment lengths are required at different attachment points.

FIG. 3 is a partially assembled view of a nut 10, 200 operable to attach to a pair of rims 700 according to another embodiment. The nut 10, 200 is operable to attach to the rims 700 by inserting into and pushing and then rotating a fastener 320 to engage the steps 220, 1200 on the helix 30 onto the rims 700. According to one embodiment, fastener 320 is a threaded bolt, a rivet, pin, clamp, prong or any suitable fastener. The steps 220, 1200 may be tapered and have a drop 1210 and a pitch 1220 that are angled such that the rim 700 engages along one of the pitch 1120 sections along the step 220.

Figure 11:
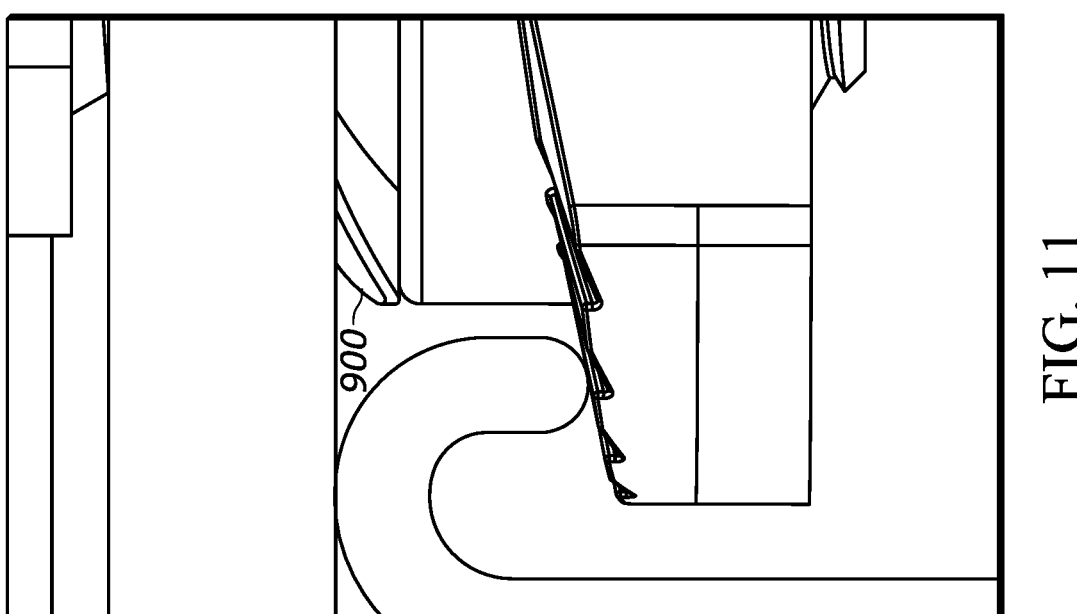
FIG. 11 is an enlarged view of the spin nut inserted into a strut channel and rotated to engage the rim of the strut.
Figure 10:
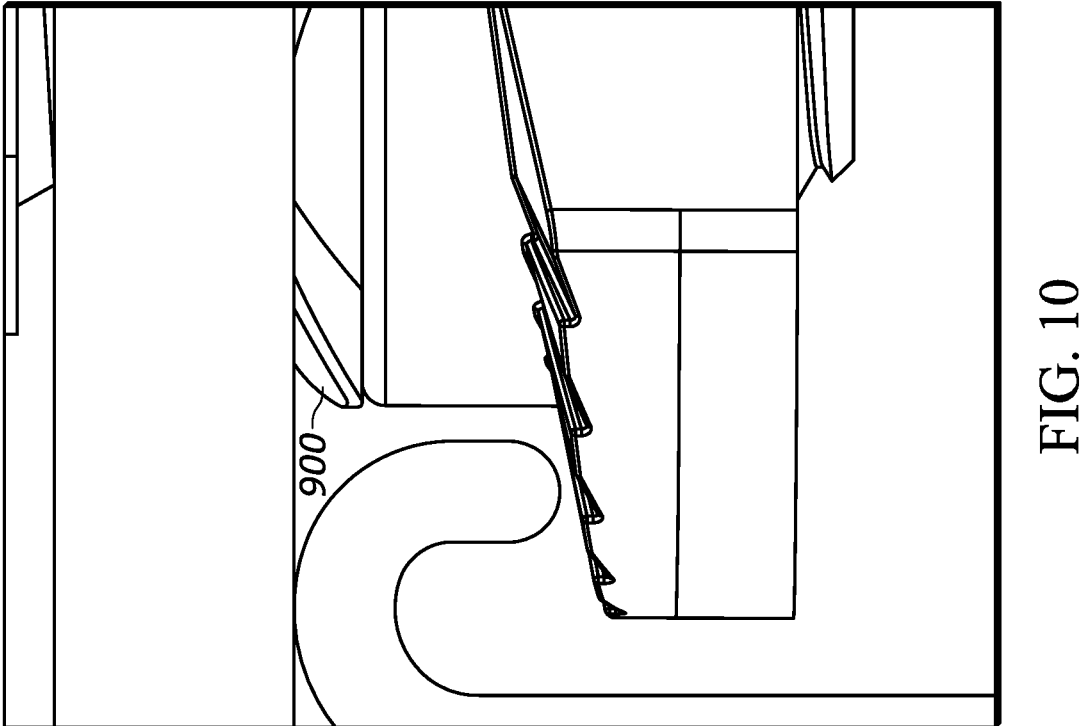
FIG. 10 is an enlarged view of the spin nut inserted and partially rotated into a strut channel prior to engagement with the rim of the strut.

As shown in FIGS. 9-11 a washer 900 according to one embodiment is detachably coupled between the collar 70 and the bracket 300. The washer 900 may be a spring compression washer 900 so that as bolt 320 is rotated then washer 900 is under compression in order to provide a pre-load between the helix 30 and the rims 700. Thus, the spring compression washer 900 allows the helix 30 when rotated to slide against rim 700 gradually increasing the compression force between helix 30 and the rims 700. This compression force holds and stabilizes the nut 10, 200 to prevent rotation. Thus, the spring compression washer 900 allows easy rotation of bolt 320 while holding the nut 10, 200 so that bolt 320 threads through nut 10, 200 until the washer 900 is sufficiently compressed or flattened and the nut 10, 200 is in the locked position.

The steps 220, 1200 on the helix 30 engage an edge portion of the strut rims 700 when in a locked position, and drop 1210 and a pitch 1220 to accommodate a lip or edge of the strut rims 700 to permit sufficient engagement with the rims 700 rim when rotating the nut 10, 200. Steps 220, 1200 provides sufficient engagement of the strut rims 700. The collar 70 form a boss or stand-off width similar to or slightly smaller than the width of the bracket slot 310 in order to sufficiently engage the bracket slot 310 and provide the desired amount of stability during installation and engagement. According to one embodiment, collar 70 and the slot 310 has a corresponding circular, round, hexagonal, square shape or any suitable shape with rounded edges, to avoid radius interference. The flange 210 may have a length that is greater than width and aids with inserting the collar 70 into the bracket slot 310. Flange 210 may have any suitable shape.

As shown in FIG. 2 the width of the neck on collar 70 is sized slightly narrower than the slot 310 width to permit insertion of the nut collar 70 into the slot 310. The collar 70 may be continuously rotated wherein the spin nut 10, 200 is operable to spin to adjust to any suitable position on the rim 700. The wing 80 is shaped with rounded edges on nut 200 shown in FIG. 2 are sized such that a radius from the center of the collar 70 allows insertion of the wing 80 into the strut channel to the closest edge of the strut permits rotation in the channel or bracket 300. The wing 80 on the nut 200 rotate any number of rotations or degrees to obtain the desired height and engagement onto rim 700.

FIGS. 10, 11, 12 are perspective views of a steps 1200 according to one embodiment. According to another embodiment, the symmetrical helix 30 further comprises a plurality of steps 220 designed with a range of suitable shapes and dimensions. The symmetrical helix further includes a plurality of steps 220 having a curvature corresponding to the surface contact on the two rims 710. The symmetrical helix engages the two rims. According to one embodiment, the symmetrical helix has an increasingly greater angle or each step may be curved to have an axially convex or concave shape depending on the surface engagement of the rims 710.

According to one embodiment, drop 1210 and pitch 1220 on each of the steps 1200 prior to engagement have clearance through corresponding depressions 1212 (shown in FIG. 12). The steps 1200 engage rims 700 and stabilize and retain the steps 1200 and to engage at a desired thickness or height. According to one embodiment, the steps 1200 include corresponding optional prongs (not shown) to engage the corresponding depressions 1212 thus engaging the nut 200.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A nut operable for blind attachment between two rims on opposing strut walls, comprising:
    a base;
    a pair of semi-circular wings formed on one end of the base;
    a symmetrical helix formed on the semi-circular wings on the other end of the base, operable to engage the two rims;
    a shoulder extending from the symmetrical helix; and
    a hole formed in the shoulder extending into the base, wherein the two rims are formed on only one side of the strut.

2. The nut operable for blind attachment of claim 1 wherein the symmetrical helix further comprises a plurality of steps which are rotated to engage the rims on the strut.

3. The nut operable for blind attachment of claim 1 wherein the symmetrical helix further comprises a plurality of steps having a curvature corresponding to a contact surface on the two rims.

4. The nut operable for blind attachment of claim 1 wherein as the nut is rotated, the symmetrical helix engages the two rims.

5. The nut operable for blind attachment of claim 1 wherein the symmetrical helix has a progressively increasing slope angle.

6. The nut operable for blind attachment of claim 1 wherein the strut is a U-shaped structure having three sides with no rims, and a side with a U-opening having the two rims formed on a channel of the strut such that the symmetrical helix is inserted in between the two rims and rotated until the symmetrical helix engages the two rims in an engaged position.

7. The nut operable for blind attachment of claim 1 wherein the nut is comprised of at least one of: zinc die cast, machine steel, cast powdered metal, cindered, vinyl, rubber, plastisol, plastic, acetal, polyacetal, polyoxymethylene, nylon, fiberglass, or carbon fiber.

8. The nut operable for blind attachment of claim 1 wherein the pair of semi-circular wings has an insert to accept a threaded nut.

9. The nut operable for blind attachment of claim 1 wherein the hole is threaded and a bolt attaches a bracket to the threaded hole.

10. The nut operable for blind attachment of claim 9 wherein the bolt attaches the bracket to the threaded hole via a spring compression washer.

11. The nut operable for blind attachment of claim 1 wherein the symmetrical helix rotates to a height to adjust to a corresponding engagement height of the two rims.

12. The spin nut of claim 1 wherein the continuous non interrupted symmetrical helix has an increasing angle in an angular rotation direction on the entire semi-circular wing.

13. The spin nut of claim 1 wherein the symmetrical helix is formed on an entire section of the semi-circular wing.

14. The spin nut of claim 1 wherein the symmetrical helix is formed on an entire locking surface of the semi-circular wing.

15. A spin nut operable for blind attachment between two rims and a bracket comprising:
    a base;
    a pair of semi-circular wings formed on one end of the base;
    a symmetrical helix formed on the wings on an other end of the base operable to engage the two rims;
    a shoulder extending from the symmetrical helix; and
        a hole formed in the shoulder extending into the base for a fastener operable to attach to a bracket having a hole and operable to spin the spin nut and to adjust to a position on the two rims,
    wherein the two rims are formed on only one side of a strut.

16. The spin nut of claim 15 wherein the symmetrical helix further comprises a plurality of steps.

17. The spin nut of claim 15 wherein the symmetrical helix further comprises a plurality of steps having a curvature corresponding to a contact surface on the two rims.

18. The spin nut of claim 15 wherein as the nut is rotated, the symmetrical helix engages the two rims.

19. The spin nut of claim 15 wherein the symmetrical helix has an increasingly greater angle.

20. The spin nut of claim 15 wherein the strut is a U-shaped structure having three sides with no rims, and a side with a U-opening having the two rims formed on the channel of a strut.

21. The spin nut of claim 15 wherein the nut is comprised of at least one of: zinc die cast, machine steel, cast powdered metal, cindered, plastic, vinyl, rubber, plastisol, acetal, polyacetal, polyoxymethylene, nylon, fiberglass, or carbon fiber.

22. A strut assembly and spin nut operable for blind attachment between two rims on the strut and a bracket comprising:
    a base;
    a pair of semi-circular wings formed on one end of the base;
    a symmetrical helix formed on the semi-circular wings on the other end of the base
    a shoulder extending from the symmetrical helix; and
        a threaded hole formed in the shoulder extending into the base for threading a bolt into the threaded hole operable to attach to a bracket having a hole and to spin the spin nut and to adjust to a position on the two rims on the strut,
    wherein the two rims are formed on only one side of the strut.

23. The strut assembly and spin nut of claim 22 wherein the symmetrical helix further comprises a plurality of steps.

24. The strut assembly and spin nut of claim 22 wherein the spin nut adjusts to a position on the two rims on the strut; wherein the strut is a U-shaped structure having three sides with no rims, and a side with a U-opening having curved rims at the ends of the U shaped structure.

25. A nut operable for blind attachment between two rims on opposing strut walls, comprising:

a base;

a pair of semi-circular wings formed on one end of the base;

wherein the semi-circular wings have a constant radius;

a symmetrical helix formed on the wings;

wherein the symmetrical helix on the wings has a surface such that the surface is operable to engage the two rims;

a shoulder extending from the symmetrical helix; and a hole formed in the shoulder extending into the base, wherein the two rims are formed on only one side of the strut.

26. The nut operable for blind attachment of claim 25 wherein the semi-circular wings have a smooth surface.

27. The nut operable for blind attachment of claim 25 wherein the surface on the semi-circular wings comprises a plurality of steps which are rotated to engage the rims on the strut.

\* \* \* \* \*